United States Patent
Bergeret et al.

(10) Patent No.: US 11,577,854 B2
(45) Date of Patent: Feb. 14, 2023

(54) MODULAR INSTRUMENT PANEL

(71) Applicant: STELIA AEROSPACE, Rochefort (FR)

(72) Inventors: Christian Bergeret, Saint-Orens de Gameville (FR); Gilles Andrieu, Montberon (FR); Alexandre Branco, Pin-Balma (FR)

(73) Assignee: STELIA AEROSPACE, Rochefort (FR)

( * ) Notice: Subject to any disclaimer, the term of this patent is extended or adjusted under 35 U.S.C. 154(b) by 0 days.

(21) Appl. No.: 17/312,372

(22) PCT Filed: Dec. 3, 2019

(86) PCT No.: PCT/EP2019/083388
§ 371 (c)(1),
(2) Date: Jun. 9, 2021

(87) PCT Pub. No.: WO2020/126453
PCT Pub. Date: Jun. 25, 2020

(65) Prior Publication Data
US 2022/0017233 A1    Jan. 20, 2022

(30) Foreign Application Priority Data
Dec. 18, 2018  (FR) ...................... 1873219

(51) Int. Cl.
*B64D 43/00*    (2006.01)
*B64F 5/10*     (2017.01)

(52) U.S. Cl.
CPC ............. *B64D 43/00* (2013.01); *B64F 5/10* (2017.01)

(58) Field of Classification Search
CPC ..... B64D 43/00; B64F 5/10; B60K 2370/654; B60Y 2200/51
See application file for complete search history.

(56) References Cited

U.S. PATENT DOCUMENTS 9,193,394 B1 * 11/2015 Bharathan .............. B62D 25/14
2007/0018440 A1 * 1/2007 Reiter ................ B60H 1/00564
280/732

(Continued)

FOREIGN PATENT DOCUMENTS

CN    105083019 A  * 11/2015  ......... B29C 45/0005
DE    19626441 B4 *  3/2004  ......... B60H 1/00028

(Continued)

OTHER PUBLICATIONS

Search Report from the French Intellectual Property Office on corresponding FR application (FR1873219) dated Sep. 25, 2019.

(Continued)

*Primary Examiner* — Donald J Wallace
*Assistant Examiner* — Jalal C Coduroglu
(74) *Attorney, Agent, or Firm* — KOS IP Law LLP

(57) ABSTRACT

Disclosed is an instrument panel designed to be integrated into an aircraft cockpit, the instrument panel comprising a main structure, extending longitudinally and having a concave shape defining a cavity, this cavity being configured to receive a plurality of navigation command and/or control units, and at least one inner wall, configured to delimit at least two recesses each intended to receive at least one of the plurality of navigation command and/or control units, the instrument panel being characterized in that the main structure is made from a single piece made from a composite material.

20 Claims, 3 Drawing Sheets

(56) References Cited

U.S. PATENT DOCUMENTS

| | | | | |
|---|---|---|---|---|
| 2007/0151655 | A1* | 7/2007 | Keller | B32B 5/04 |
| | | | | 156/176 |
| 2007/0261438 | A1* | 11/2007 | Ezaka | B60H 3/0028 |
| | | | | 62/643 |
| 2010/0069923 | A1* | 3/2010 | Nguyen | A61B 17/0401 |
| | | | | 606/232 |
| 2012/0075120 | A1* | 3/2012 | Barbieri | B64D 43/00 |
| | | | | 340/946 |
| 2013/0148325 | A1* | 6/2013 | Guering | B60K 37/00 |
| | | | | 248/27.1 |
| 2014/0088535 | A1* | 3/2014 | Xu | A61F 13/15731 |
| | | | | 604/366 |
| 2014/0186166 | A1* | 7/2014 | Kostka | F01D 5/143 |
| | | | | 415/182.1 |
| 2016/0001823 | A1* | 1/2016 | Bharathan | B29C 45/16 |
| | | | | 296/70 |
| 2017/0284449 | A1* | 10/2017 | Greegor | F16B 33/004 |
| 2017/0314606 | A1* | 11/2017 | Le | F16B 35/041 |
| 2021/0086457 | A1* | 3/2021 | Ham | B29C 70/86 |
| 2022/0161993 | A1* | 5/2022 | Loh | B65D 90/024 |

FOREIGN PATENT DOCUMENTS

| | | | | |
|---|---|---|---|---|
| DE | 102008043512 A1 * | 5/2010 | | B60H 1/00535 |
| FR | 2939766 A1 | 6/2010 | | |
| FR | 2964084 A1 | 3/2012 | | |
| FR | 2965248 A1 | 3/2012 | | |
| RU | 2671341 C2 * | 10/2018 | | B29C 44/00 |
| WO | WO-0051360 A1 * | 8/2000 | | B60R 25/042 |
| WO | WO-2010069923 A1 * | 6/2010 | | B64D 11/00 |

OTHER PUBLICATIONS

International Search Report and Written Opinion on corresponding PCT application (PCT/EP2019/083388) from International Searching Authority (EPO) dated Feb. 25, 2020.

* cited by examiner

MODULAR INSTRUMENT PANEL

TECHNICAL FIELD

The present invention relates to the field of interior furniture items of an aircraft and more specifically to an instrument panel for an airplane cockpit.

BACKGROUND

In a known manner, an airplane cockpit, mounted in a pilot cabin, comprises a plurality of interior furniture items allowing the various pieces of equipment necessary to pilot the airplane, such as control screens and flight control devices, to be received.

More precisely, the cockpit comprises, in a known manner, a central pylon, arranged between the two seats intended for the pilot and the co-pilot of the airplane and generally comprising the engine control lever, two lateral brackets, disposed on either side of the cockpit and each accessible by the pilot or the co-pilot, and an instrument panel, extending substantially transversely to the front of the cockpit. Such an instrument panel is especially configured to present different screens displaying data relating to navigation to the pilot and co-pilot.

In this document, the term transverse is defined with reference to FIG. 1, in which, by way of example, an airplane 100 extends longitudinally along an X axis, laterally along a Y axis and vertically along a Z axis so as to form an orthogonal reference frame (X, Y, Z). In such a reference frame, the term "transverse" defines an object extending along the width of the airplane 100 in the (Y, Z) plane. Furthermore, in such a reference frame, front and rear are defined along the X axis with reference to the displacement of the airplane 100 in flight. In other words, still with reference to FIG. 1, the front and rear of the airplane 100, and therefore of the pilot cabin 200, are defined along the X axis in FIG. 1 which is oriented from the rear to the front.

According to the state of the art, with reference to FIG. 2, an instrument panel 102 is an assembly of metal parts and panels, generally assembled by riveting or by means of bolts. Such a metal structure has the drawback of being heavy and complex to handle. Thereby, in a known way, each metal panel is perforated in order to lighten the structure while ensuring its rigidity. However, such an operation, generally carried out by machining, is complex to implement and increases manufacturing costs. Furthermore, such an assembly of metal parts has the drawback of generating numerous assembly clearances when assembling them, which can lead to significant stresses in the parts and significant loads in the fasteners, especially when these are loaded, for example during airplane take-off.

Also, an instrument panel is known, described in document FR 2964084 B1, made of a composite material with an alveolar structure known as "honeycomb". Such a material ensures both rigidity and lightness of the structure. The instrument panel described in document FR 2964084 B1 is in the form of a panel, thus having a reduced thickness and therefore small overall size in the pilot cabin. However, such an instrument panel only allows the integration of thin monitors, such as flat screens for example.

However, in an airplane cockpit, each display device is generally associated with computing means allowing the analysis of the data processed by the monitor. Such computing means provide the display device with larger dimensions than those of a flat screen. However, the instrument panel described in document FR 2964084 B1 only allows the integration of display devices whose computing means are unsecured from the screen. Thus, such an instrument panel does not allow the integration of all types of monitor, which is a major drawback.

One of the objectives of the present invention is to provide a lightweight, robust and simple to manufacture instrument panel allowing the integration of any type of display screens. In particular, one object of the present invention is a one-piece instrument panel configured to ensure modularity of the locations of the navigation control and/or monitor pieces of equipment, while limiting the number of fasteners.

From document FR 2939766A1, a central pylon disposed between the seats of the two pilots and comprising a shell of composite material is known. However, FR 2939766A1 does not describe an instrument panel placed in front of the pilot seats.

SUMMARY

To this end, the invention relates to an instrument panel for being integrated into an aircraft cockpit, said instrument panel comprising a main structure, extending longitudinally and having a concave shape defining a concavity, said concavity being configured to receive a plurality of navigation control and/or monitor pieces of equipment, and at least one inner partition, configured to delimit at least two housings each for receiving at least one of said plurality of navigation control and/or monitor pieces of equipment, the instrument panel being remarkable in that the main structure is formed in one piece from a composite material.

Such an instrument panel made of composite material has the advantage of being both more robust and lighter, allowing the weight of the equipment mounted in the cockpit to be limited. In addition, such an instrument panel is easier and faster to manufacture, also allowing mass production of a typical instrument panel that can be integrated into any cockpit. Such a mass production also allows for reduced manufacturing time and costs, as it is not necessary to machine each panel after manufacture.

According to one preferred aspect of the invention, the instrument panel comprises a plurality of inner partitions whose position in the concavity is variable according to the navigation control and/or monitor pieces of equipment to be placed. Such a variable, not predefined, position advantageously allows a modular instrument panel adaptable to different types of airplane or cockpit. The variable positioning of the inner partition also allows the integration of different types of equipment having for example different dimensions.

Preferably, said at least one inner partition is fastened to the main structure by over-injecting said composite material, enabling the placement of additional fastening elements to be dispensed with. Such a fastening thus makes it possible to limit the occurrence of weak zones in the structure, that is zones that may have stress concentrations or greater loads, for example.

Preferably, said at least one inner partition is formed in one piece from said composite material, allowing homogeneity of the instrument panel. The use of the same material for all the inner partitions and the main structure makes it possible to limit stresses between the parts and to facilitate the manufacture of the instrument panel, saving time and therefore limiting manufacturing costs.

According to one aspect of the invention, the instrument panel preferably has a length of between 1600 and 1800 mm, allowing a typical instrument panel to be placed on different cockpits, for being mounted in different types of airplane.

Preferably, the instrument panel has a depth of between 100 and 200 mm, allowing the integration into the concavity of different types of navigation control and/or monitor equipment, comprising computing means or not.

Advantageously, the said composite material is a thermoplastic polymeric material, making it possible to produce an instrument panel that is both light and robust and allowing rapid manufacture by stamping or thermoforming of polymeric material.

According to one aspect of the invention, the instrument panel comprises a system for attaching a ventilation system, allowing the ventilation system to be quickly and easily integrated into the cockpit. Such an attachment system further allows integration of the ventilation systems before the instrument panel is mounted in the pilot cabin.

Preferably, the main structure comprises a rear face, comprising a plurality of openings, configured to allow air circulation inside the concavity and thus cool the plurality of pieces of equipment mounted inside said concavity. Such openings advantageously allow ventilation of the navigation control and/or monitor pieces of equipment housed in the concavity, thereby limiting the risks of overheating and degrading the equipment.

According to one characteristic of the invention, said at least one inner partition comprises a system for locking one of the said plurality of navigation control and/or monitor pieces of equipment. Such a locking system advantageously makes it possible to limit risks of movements of each piece of equipment during maneuvers of the airplane (for example during take-off or landing) or for example during turbulence.

According to one preferred aspect of the invention, said at least two housings each comprise a power system for one of said plurality of navigation control and/or monitor pieces of equipment. The direct integration of the power system into each housing subsequently allows time saving in mounting each equipment on the instrument panel.

According to another aspect of the invention, the instrument panel comprises at least one return spring, configured to hold in place one of said plurality of navigation control and/or monitor pieces of equipment in one of said housings, allowing to limit any displacement of the equipment.

The invention also relates to a method for manufacturing an instrument panel as described above, said method comprising:
- a step of forming a main concave-shaped structure in one piece by thermoforming a plate of composite material, and
- a step of fastening at least one inner partition to the main concave-shaped structure by over-injecting composite material.

Preferably, the method further comprises, prior to the step of fastening said inner partition, a step of trimming the main structure and the inner partition, so as to unsecure them from said plate of composite material.

Preferably, the method further comprises a step of determining the number of housings required, and a step of positioning one or more partition(s) so as to delimit each housing.

Preferably, the manufacturing method comprises a step of integrating a locking system of said plurality of navigation control and/or monitor pieces of equipment.

Preferably, the method comprises a step of integrating an electric power system, for powering said plurality of navigation control and/or monitor pieces of equipment.

BRIEF DESCRIPTION OF THE DRAWINGS

The invention will be better understood upon reading the following description, given only by way of example, and referring to the appended drawings given as non-limiting examples, in which identical references are given to similar objects and in which.

It should be noted that the figures disclose the invention in a detailed manner for implementing the invention, said figures being of course able to be used to better define the invention if necessary.

DETAILED DESCRIPTION

Figure 1:
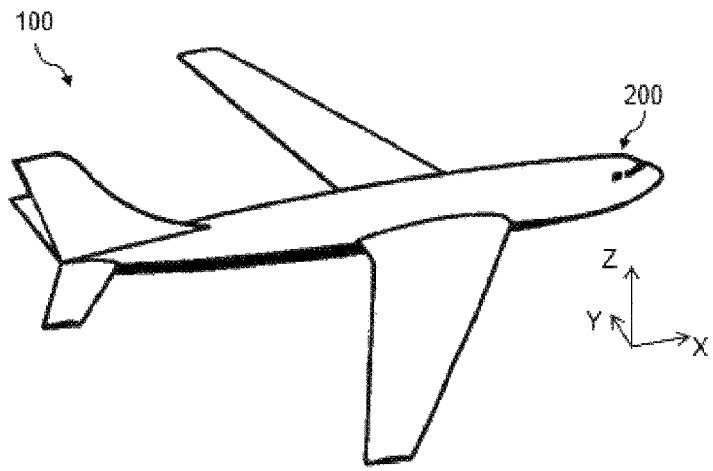
FIG. 1 is a schematic representation of an airplane, as well as a definition reference frame of such an airplane.
Figure 2:
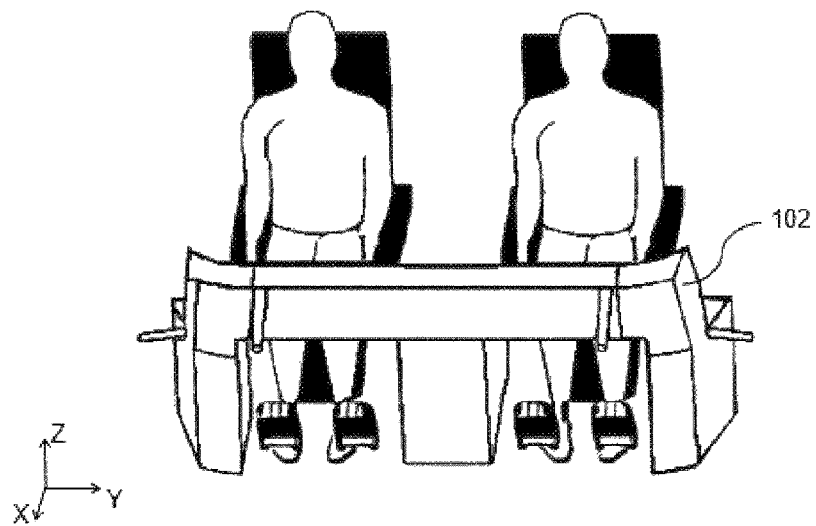
FIG. 2 represents schematically an instrument panel of prior art.

With reference to FIG. 1, an airplane 100 is represented extending longitudinally along an X axis oriented from back to front, laterally along a Y axis oriented from right to left and vertically along a Z axis oriented from bottom to top so as to form an orthogonal reference frame (X, Y, Z). In such a reference frame, the term "horizontal" defines an object extending in the (X, Y) plane and the term "transverse" defines an object extending in the (Y, Z) plane.

In a known manner, the airplane 100 comprises at the front thereof a pilot cabin 200, delimiting the portion of the fuselage located at the front of the airplane 100 and in which the pilot and the co-pilot are situated. The pilot cabin 200 comprises a structural framework configured to receive a cockpit 1 (FIG. 3).

Figure 3:
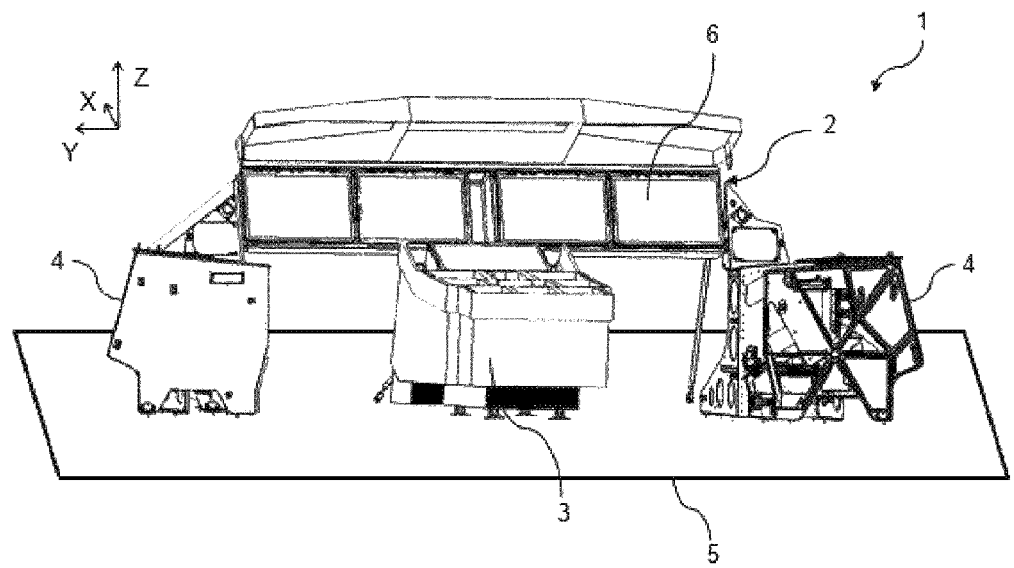
FIG. 3 is a schematic representation of a cockpit comprising an instrument panel according to one embodiment of the invention.

With reference to FIG. 3, a cockpit 1 is represented which is adapted to be mounted in the pilot cabin 200. The cockpit 1 comprises all of the devices necessary for flying the airplane 100. Such a cockpit 1 thus comprises an instrument panel 2 according to the invention, a plurality of interior furniture items and a floor 5, on which the interior furniture items rest. The plurality of interior furniture items comprises a central pylon 3, disposed between both seats intended for the pilot and the co-pilot of the airplane 100 (not represented), and two side brackets 4, positioned on either side of the cockpit 1 and each accessible by the pilot or co-pilot. Each of the interior furniture items is configured to receive a plurality of navigation control and/or monitor devices for the airplane 100, such as the engine control lever (commonly referred to as the throttle lever), control buttons or fuel or altitude monitor gauges for example.

In such a cockpit 1, the instrument panel 2 is configured to extend transversely. In other words, the length of the instrument panel 2 extends across the width of the airplane 100, along axis Y so as to present a set of flight control and/or monitor devices to the pilot and co-pilot, for example a plurality of display devices 6. In the following, the front of the instrument panel 2 defines the surface facing the pilot and co-pilot in flight, that is the side of the instrument panel 2 oriented to the rear of the pilot cabin 200 in the airplane 100. In other words, the front and rear of the instrument panel 2 are reversed with respect to the front and rear of the cockpit 1.

In this example, the instrument panel 2 according to the invention is configured to be fastened both to the floor 5 and the interior furniture items of the cockpit 1. Such a fastening will not be described further herein.

Figure 4:
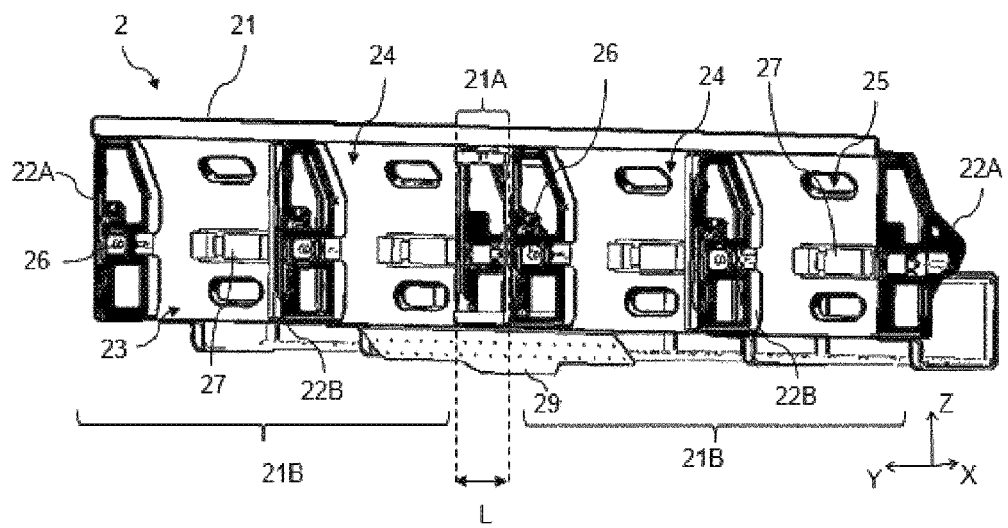
FIG. 4 is a front view of an instrument panel according to one exemplary embodiment of the invention.

According to one preferred embodiment of the invention, the instrument panel 2 is made of a composite material, preferably of a thermoplastic polymeric material (of the glass fibers type, for example), allowing the manufacture of a lightweight yet robust instrument panel 2. With reference to FIG. 4, such an instrument panel 2 comprises a main structure 21 and a plurality of inner partitions 22, configured to delimit a plurality of housings 24.

The main structure 21 is as one piece, that is formed in a single piece, so as to limit junctions between several assembled parts, thus advantageously allowing the instrument panel 2 to be reinforced. Such a one-piece structure is preferably concave in shape, delimiting a concavity 23 for receiving a plurality of engine control and/or monitor pieces of equipment for the airplane 100 and to present them to the pilot and/or co-pilot. In other words, in the (X, Z) plane formed in the reference frame (X, Y, Z), the concavity 23 is substantially of C-shaped cross-section, closed at the rear of the instrument panel 2 and open towards the front of the instrument panel 2, that is towards the rear of the cockpit 1, so that the equipment can face the pilot and the co-pilot. Such a concavity 23 is for receiving, for example, a plurality of display devices 6, having different volumes and depths.

Indeed, according to one preferred aspect of the invention, the main structure 21 has a length, that is a dimension along Y axis, of between 1600 and 1800 mm, so as to allow for example the integration of display devices 6 extending along different screen widths. Such a length of the instrument panel 2 also advantageously allows it to be placed on different cockpits 1 to be mounted in different types of airplane 100. Also, the instrument panel 2 according to the invention allows harmonization and mass production of a single type of instrument panel 2 for any type of airplane 100. Likewise, the depth of the concavity 23, that is the dimension along axis X, is preferably between 100 and 200 mm, so as to advantageously allow the integration of different types of display devices 6, for example flat screens, deeper screens or screens comprising or not comprising computing means.

According to one preferred embodiment of the invention, such a main structure 21 is manufactured by injecting thermoplastic material into a mold. The manufacture of the structure 21 as well as the entire instrument panel 2 will be described in more detail in the following.

In order to allow ventilation of the display devices 6 mounted in the concavity 23, the main structure 21 comprises a plurality of openings 25, preferably positioned on a rear face of the instrument panel 2, that is oriented towards the front of the cockpit 1. Preferably, the main structure 21 comprises at least one opening 25 per housing 24 for receiving an engine control and/or monitor equipment for the airplane 100.

Indeed, as previously described and still with reference to FIG. 4, in order to delimit a plurality of housings 24 in the concavity 23, the instrument panel 2 according to the invention comprises a plurality of inner partitions 22. Two inner partitions 22 are positioned at the longitudinal ends of the instrument panel 2 (lateral inner partitions 22A) and a plurality of partitions is placed at intermediate positions (intermediate inner partitions 22B), delimiting a plurality of housings 24 each for receiving, in this example, a display device 6. In the example represented in FIG. 4, the instrument panel 2 comprises six inner partitions (two lateral inner partitions 22A and four intermediate inner partitions 22B), for delimiting four housings 24. Such inner partitions 22, the number and positioning of which can be adapted according to, for example, the type of airplane 100 in which the cockpit 1 is for being mounted or according to the type of display devices 6 placed, advantageously allow the instrument panel 2 according to the invention to be modular and to be able to adapt to any type of cockpit 1.

As is represented in FIG. 4, all the housings 24 preferably have similar dimensions, so as to allow the integration of identical display devices 6. Also, when the display devices 6 do not extend over the entire length of the main structure 21, two inner partitions 22 may be arranged on a central portion 21A of the main structure 21 and spaced apart by a length, referred to as the central space L (corresponding to the total length of the main structure 21 minus the length of all the display devices 6). Such a central space L makes it possible to evenly distribute positioning of the display devices 6 over the entire length of the instrument panel 2, advantageously making it possible to balance the weight of the display devices 6 on the cockpit 1. Such a balance thus makes it possible to limit the occurrence of local stresses due to local overweight, while ensuring that the housings 24 have adequate dimensions to provide lateral support of the display devices 6. Such a central space L can thus vary, for example, according to the type of display devices 6 placed, advantageously making it possible to adapt the size of the housings 24 and thus the instrument panel 2 to any type of display devices 6. Once the central space L has been delimited, all of the display devices 6 are then evenly distributed over two lateral portions 21B, represented in FIG. 4.

In a similar way to the main structure 21, each inner partition 22 is made in one piece from a composite material, preferably from a thermoplastic polymeric material (of the glass fiber type for example), allowing the manufacture of a complete instrument panel 2 that is both light and robust. Even more preferably, all the inner partitions 22 are made of the same composite material as the material used for the manufacture of the main structure 21, allowing the manufacture of a homogeneous instrument panel 2.

According to one preferred aspect of the invention, each inner partition 22, previously trimmed and manufactured, is configured to be fastened to the main structure 21 by over-injecting thermoplastic composite material, identical to the material used for manufacturing the main structure 21 and the inner partitions 22. Such an over-injection makes it possible to dispense with fastening devices of the screw or insert type for example, making it possible to lighten the instrument panel 2, to dispense with assembly clearances between several parts as well as to limit stresses due to connection loads for example. Such a fastening of the inner partitions 22 also allows for simple and rapid manufacturing and assembly, making it possible to limit production costs, as will be described in more detail later in this document.

Figure 5:
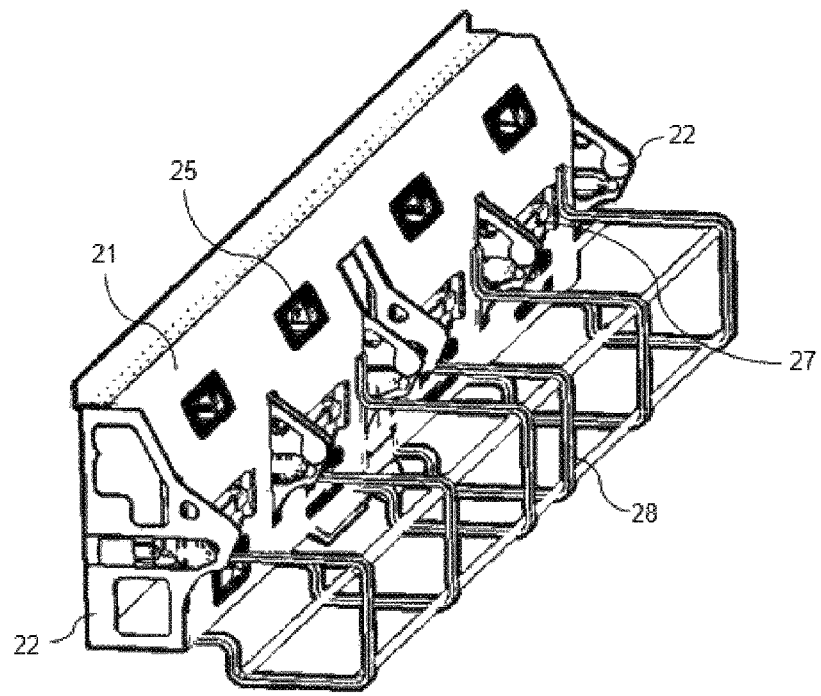
FIG. 5 is a rear view of the instrument panel of FIG. 4.

Preferably, with reference to FIGS. 4 and 5, the instrument panel 2 is configured to also allow simplified integration of a plurality of locking systems 26 of the display devices 6 in each housing 24, a plurality of power systems 27 of each display device 6, and an attachment system 28 of a ventilation system, allowing ventilation of the concavity 23.

Indeed, each inner partition 22 is preferably configured to comprise a locking system 26 configured to hold the display device 6 placed in the housing 24 delimited by said inner partition 22 in place. Such a locking system 26 is, for example, in the form of a pin, laterally projecting from the inner partition 22 and configured to be inserted into a fastening hole integrated in the display device 6. Such a locking system 26, pre-integrated into each inner partition 22, advantageously makes it possible to limit the time required to mount the equipment in the instrument panel 2 while ensuring positioning of the display devices 6 in each housing 24, especially making it possible to avoid any displacement during the take-off of the airplane 100 or in the event of turbulence. This document sets forth the example of inner partitions comprising a single locking system 26, however it goes without saying that each inner partition 22, especially each intermediate inner partition 22B, could comprise two locking systems 26, extending on either side of the inner partition 22 so as to allow the fastening of each display device 6 at two points on either side of the screen.

In addition, optionally, the instrument panel 2 comprises a plurality of return springs (not represented), configured to allow the reinforcement of each display device 6 holding in place, so as to limit any displacement in X direction especially during the take-off and landing of the airplane 100. Such a return spring, preferably fastened on the rear face inside the concavity 23, is housed inside each housing 24, so as to be positioned opposite each display device 6.

The main structure 21 further comprises, at each housing 24, a power system 27 for the display device 6. Preferably, such a power supply 27 is fastened to the bottom of the concavity 23 on the rear side of the main structure 21 so as to allow easy connection of each power supply 27 to a display device 6 when mounted in the housing 24. Such a power system 27 pre-integrated in each housing 24, advantageously makes it possible to limit the time required to mount and connect the equipment in the instrument panel 2.

As is represented in FIG. 5, the instrument panel 2 according to the invention also comprises a system 28 for attaching a ventilation system, allowing ventilation of the concavity 23. Such an attachment system 28 is in this example in the form of a plurality of metal bars, extending longitudinally along the length of the instrument panel 2, preferably to the rear of the rear face of the concavity 23, so as to allow air passage through the openings 25 described above, while limiting the overall size in the cockpit 1. The cockpit ventilation system 200 is then configured to be inserted into the reinforcement formed by the set of metal bars of the attachment system 28.

In this example, the locking system 26, the power system 27 and the attachment system 28 are fastened to the instrument panel 2 by means of inserts integrated into the composite panels that form the main structure 21 and each of the inner partitions 22. However, it goes without saying that any fastening system, such as bolted connections for example, could also be used.

According to one embodiment of the invention, with reference to FIG. 4, the instrument panel 2 further comprises a positioning module 29, configured to enable the instrument panel 2 to be placed on the central pylon 3. Such a positioning module 29, preferably made of a metal material, projects towards the front of the instrument panel 2 (that is towards the rear of the cockpit 1), so as to rest on the central pylon 3. Preferably such a positioning module 29 is fastened to the main structure 21 of the instrument panel 2 by riveting. Advantageously, the positioning module 29 according to the invention allows the instrument panel 2 to be stabilized by resting on the central pylon 3 via the positioning module 29, which may further comprise a plurality of fastening holes, so as to fasten it to the central pylon 3.

This document sets forth the example of the placement of a plurality of display devices in each housing 24 of the concavity 23, however it goes without saying that the instrument panel 2 could just as well be configured to receive a plurality of pieces of equipment of other types.

Figure 6:
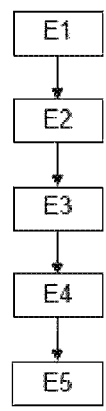
FIG. 6 represents the steps of a method for manufacturing an instrument panel according to one embodiment of the invention.

With reference to FIG. 6, a method of manufacturing an instrument panel 2 according to one preferred mode of implementation of the invention will now be described.

In a first step E1, the operator positions a thermoplastic plate in a press, that is in a machine for forming a part by stamping, otherwise known as thermoforming. Such a press allows shaping of both the main structure 21, manufactured in one piece, and the inner partitions 22, whose dimensions have been predetermined. More precisely, by way of example, a thermoplastic plate having dimensions large enough to produce all the structural parts of the instrument panel 2, is positioned in a hydraulic press and then heated and pressed so as to allow local formation of the design of the instrument panel 2, allowing for example formation of the openings 25 and the relief of the main structure 21 and the inner partitions 22. The composite material then solidifies so as to retain the shape of the press impression. Such an embodiment is known to the skilled person and will not be described further herein.

In a step E2, the operator then trims the main structure 21 as well as each inner partition 22 stamped, so as to unsecure each part from the thermoplastic plate.

The operator then determines, in a step E3, the number of housings 24 necessary for the placement of all the display devices 6. In this same step, the operator determines both the central space L to be integrated into the main structure 21 and the location of each of the inner partitions 22 required, so as to distribute the weight of all of the display devices 6 as well as possible. Each inner partition 22 further preferably comprises a locking system 26 for fastening a display device 6, such locking system 26 being previously mounted upon manufacturing each inner partition 22.

The method then comprises a step E4, in which the operator fastens each inner partition 22 in the concavity 23 of the main structure 21. According to one preferred implementation of the invention, such fastening is achieved by over-injecting composite material, that is by heating at the junction between the inner partition 22 and the main structure 21 and re-injecting a predetermined amount of the composite material used for manufacturing the main structure 21 and each inner partition 22. As the junction cools, the material solidifies, fastening the inner partition 22 into the concavity 23. Such an over-injection fastening method advantageously limits the need for additional fastening elements, thus limiting local stresses in the parts. Such an over-injection method also makes it possible to manufacture a lightweight instrument panel 2 that is easy to handle without tooling.

The operator then fastens, in a step E5, in each housing 24, an electric power system 27 for powering each display device 6, and an attachment system 28 for the ventilation system, for ventilating all the display devices 6. In this same step, the operator also fastens, at each housing 24 in the concavity 23, a return spring for the positioning of a display device 6.

Once the instrument panel 2 has been integrated into the cockpit 1, the operator can then proceed to mount the plurality of display devices 6 in the concavity 23 of the instrument panel 2, each display device 6 being mounted inside each housing 24 delimited by the inner partitions 22. The operator thus integrates one display device 6 per housing 24 by fastening the latter by means of one or two locking systems 26, while connecting the display device 6 to the power system 27.

The instrument panel according to the invention advantageously allows the use of a light and robust instrument panel comprising a limited number of fasteners. Furthermore, such an instrument panel is modular, allowing the number and dimensions of each housing to be adapted, advantageously making it possible to adapt the configuration of the instrument panel to different types of cockpit, to different airplanes and to different types of equipment, especially different display devices having different dimensions both in width and in depth. Finally, such an instrument panel allows complete pre-assembly of all the parts necessary for the operation and integration of the navigation control and/or monitor equipment, before its placement in the cockpit.

The invention claimed is:

1. An instrument panel for being integrated into a cockpit of an aircraft, said instrument panel comprising a main structure, extending longitudinally and having a wall surface with a concave shape defining a concavity, said wall surface with the concavity being configured to receive a plurality of navigation control and/or monitor pieces of equipment so that the wall surface faces a front of the cockpit and an opening opposite the wall surface faces a rear of the cockpit when the instrument panel is mounted inside the cockpit, and at least one inner partition configured to delimit at least two housings each for receiving at least one of said plurality of navigation control and/or monitor pieces of equipment, the instrument panel being characterized in that the main structure is formed in one piece from a composite material.

2. The instrument panel according to claim 1, wherein said at least one inner partition is fastened to the main structure by over-injecting said composite material.

3. The instrument panel according to claim 1, wherein said at least one inner partition is formed in one piece in said composite material.

4. The instrument panel according to claim 1, wherein said composite material is a thermoplastic polymeric material.

5. The instrument panel according to claim 1, comprising an attachment system for a ventilation system.

6. The instrument panel according to claim 1, wherein the main structure comprises a rear face, comprising a plurality of openings, configured to allow air circulation inside the concavity and thus cool the plurality of pieces of equipment mounted inside said concavity.

7. The instrument panel according to claim 1, wherein said at least one inner partition comprises a locking system of one of said plurality of navigation control and/or monitor pieces of equipment.

8. The instrument panel according to claim 1, wherein said at least two housings each comprise a power system of one of said plurality of navigation control and/or monitor pieces of equipment.

9. An instrument panel for being integrated into a cockpit of an aircraft, said instrument panel comprising:
a main structure extending longitudinally and having a wall surface of an inside face with a concave shape defining a concavity and a maximum length transverse to a length of the cockpit when mounted inside the cockpit;
at least two spaced apart inner partitions arranged on a central portion of the main structure to define a central space having a central space length;
at least two housings with each of the two housings located to a lateral side of two lateral sides of the central space, each of the at least two housings having a size configured for receiving at least one display device;
wherein the main structure is formed in one piece from a composite material; and
wherein the central space length is selected by a spacing between the at least two spaced apart inner partitions to distribute the at least two housings to the two lateral sides of the central space to then distribute the display devices relative to the central space when mounted inside the at least two housings.

10. The instrument panel according to claim 9, further comprising a lateral inner partition located at a lateral end of the main structure.

11. The instrument panel according to claim 9, wherein each housing has a first opening for receiving the at least one display device and a second opening on the wall surface of the inside face opposite the first opening for ventilation.

12. The instrument panel according to claim 9, wherein the inside face of the concavity has a plurality of return springs fastened to the display devices.

13. The instrument panel according to claim 9, wherein the concavity is C-shaped and an opening opposite the wall surface of the inside face is configured to be oriented towards a rear portion of the cockpit when the instrument panel is positioned in the cockpit.

14. The instrument panel according to claim 9, wherein said at least two spaced apart inner partitions are fastened to the main structure by over-injecting said composite material.

15. An instrument panel for integrating into a cockpit of an aircraft, said instrument panel comprising:
a main structure having a length orientated transversely to cockpit when mounted inside the cockpit and having a wall surface on an inside face with a concave shape defining a concavity;
at least one inner partition and two outer inner partitions attached to the main structure;
at least two housings with each of the two housings located laterally of a central portion of the main structure and laterally inwardly of one of the two outer inner partitions;
an opening opposite the wall surface of each housing for receiving at least one display device, wherein the opening is oriented to face a rear portion of the cockpit when the instrument panel is positioned in the cockpit; and
wherein the main structure is formed in one piece from a composite material.

16. The instrument panel according to claim 15, wherein the wall surface of the concavity is generally C-shaped.

17. The instrument panel according to claim 15, further comprising a positioning module configured to enable placement of the instrument panel on a central pylon of the cockpit of the aircraft.

18. The instrument panel according to claim 15, wherein the at least one inner partition is made from a same composite material as the main structure.

19. The instrument panel according to claim 15, further comprising an opening formed on the wall surface for ventilation.

20. The instrument panel according to claim 15, wherein the at least one inner partition is a first inner partition and further comprising a second inner partition, the first inner partition and the second inner partition defining a central space and a length of the central space is selected to distribute the at least two housings laterally of the central space.

\* \* \* \* \*